United States Patent [19]

Andre

[11] Patent Number: 4,608,260

[45] Date of Patent: Aug. 26, 1986

[54] PROCESS FOR CONTROLLING THE COOKING PROCESS IN A STEAM PRESSURE COOKER

[75] Inventor: Wolfram K. Andre, Aichwald, Fed. Rep. of Germany

[73] Assignee: Kurt Wolf & Co. KG, Fed. Rep. of Germany

[21] Appl. No.: 619,317

[22] Filed: Jun. 11, 1984

[30] Foreign Application Priority Data

Jun. 29, 1983 [DE] Fed. Rep. of Germany ....... 3323399

[51] Int. Cl.$^4$ .......................... A47J 27/62; H05B 1/02
[52] U.S. Cl. ..................................... 426/233; 99/327; 126/369; 219/492; 340/589; 426/510; 426/523
[58] Field of Search ............... 426/231, 233, 523, 509, 426/510, 511, 243; 99/327, 332, 335, 410; 126/369, 377; 219/492, 497; 340/589

[56] References Cited

U.S. PATENT DOCUMENTS

| | | | |
|---|---|---|---|
| 3,932,675 | 1/1976 | Main | 426/233 |
| 3,961,893 | 6/1976 | Russell et al. | 126/369 |
| 4,154,855 | 5/1979 | Buck | 426/243 |
| 4,379,964 | 4/1983 | Kanazawa et al. | 219/497 |

FOREIGN PATENT DOCUMENTS 0074108 3/1983 European Pat. Off. ............. 99/327

*Primary Examiner*—George Yeung
*Attorney, Agent, or Firm*—Thomas W. Speckman

[57] ABSTRACT

A process and apparatus to control the cooking process in a steam pressure cooker heated with a heating element controlled through a control circuit wherein the temperature of the pressure cooker is detected and utilized by the control circuit to regulate the heat output of the heating element, and wherein a cooking time can be preset by means of an adjustable timing element. To automatically adjust the preset cooking time for the time constants of the cooking system dependent upon the nature and quantity of cooking material, the slope of the temperature-time characteristic line of the entire system is detected in the heating phase, the time period which elapses between reaching the temperature of the beginning of the vapor phase and the evaporation temperature of the water in the pressure cooker is measured, and the preset cooking time is adjusted depending upon the detected slope and the determined time period and is shortened by a time interval that is greater, the smaller the slope and the greater the determined time period.

9 Claims, 8 Drawing Figures

PROCESS FOR CONTROLLING THE COOKING PROCESS IN A STEAM PRESSURE COOKER

BACKGROUND OF THE INVENTION

1. Field of the Invention

The invention concerns a process and apparatus to control the cooking process in a steam pressure cooker heated by a heating element controlled by a control circuit, wherein the temperature in or on the steam pressure cooker is detected and utilized by the control circuit to regulate the heat output of the heating element, and in which a cooking time is preset by means of an adjustable timing element.

2. Description of the Prior Art

Devices of this kind are known, in which the timing element is manually adjustable and electrically and mechanically separate from the control circuit of the heating element. When the preset cooking time expires, an optical and/or acoustical signal is emitted by the timing element to indicate the end of the cooking time. The heating element is then turned off by hand, and many possible sources of error may effect the cooking time.

In these known devices the cooking time is preset to a fixed time period which disregards the time constant of the cooking system comprising the heating element and steam pressure cooker. Depending upon the size of the steam pressure cooker, the heat output of the heating element, and the amount of cooking material in the pressure cooker, the cooking system has different heating and cooling phases which result in various temperature-time characteristic lines during the cooking process. In addition to the inadequacies of manually shutting off the heating element, consideration of the varying time constants of the cooking system is neglected in the known devices. The cooking time preset by means of the timing element can, however, be so influenced by these variable properties of the cooking system that the cooking time can be too short or too long. In the heating phase, measurement of the cooking time is independent of the actual slope of the temperature-time characteristic line, which can lead to shortening of the actual cooking time. In the cooling phase, after the heating element is shut off, the cooking system remains for some time at the cooking temperature, so that the preset cooking time is lengthened.

In these known devices a further shortcoming appears, since the cooking time also depends on the time constants of the cooking system, which depend on the nature of the cooking material and the amount of cooking material. If, for example, a soup or a vegetable stew or the like is being cooked, then the conditions are different from those in the steaming of potatoes, meat or the like over a waterbath. These types of cooking are hereinafter referred to, respectively, as the cooking of "liquid" or "solid" material. These different types of cooking are also referred to as "cooking" ("boiling") or "steaming", respectively.

SUMMARY OF THE INVENTION

It is an objective of this invention to provide a method to control the cooking process in a steam pressure cooker of the type mentioned above, in which the preset cooking time, independently of the time constants of the cooking system and the kind and quantity of cooking material, is automatically adjusted so that the cooking temperature is maintained in the pressure cooker for the preset cooking time.

This objective is accomplished according to this invention as follows: in the heating phase the slope of the temperature-time characteristic line of the whole system is detected, the period of time between reaching the temperature of the beginning of the vapor phase and reaching the evaporation temperature of the water in the pressure cooker is measured, the preset cooking time is adjusted in accordance with the detected slope and the time difference measured, so that it is shortened by a time interval that is greater as the detected slope decreases and the time difference measured increases.

This method takes advantage of the knowledge that the cooling phase after the heating element is shut off, represented by the shape of the temperature-time characteristic line in the cooling phase, is dependent on the cooking system comprising a heating element and steam pressure cooker, and the kind of cooking, as well as the quantity of cooking material. This relationship is expressed in the slope of the temperature-time characteristic line during the heating phase and the period of time which elapses between reaching the vapor phase temperature and reaching the evaporation temperature of the water. It has been shown that the slope of the temperature-time characteristic line varies depending on the quantity of liquid cooking material, while the period of time is correspondingly increased with an increasing quantity of solid cooking material. The amount of cooking material affects the cooling phase, which is lengthened with increasing quantity of cooking material.

Consideration of the detected slope of the temperature-time characteristic line during the heating phase and the length of time measured for the temperature rise from the vapor phase temperature to the evaporation temperature of water, will yield a measurement of the type and quantity of cooking material, and a determination can be made regarding the cooling phase occurring in that specific cooking process. The cooling phase, which, of course, affects the cooking time, can thereby be predicted and used to make the appropriate adjustment, by shortening the preset cooking time.

In one embodiment of this method, the detected slope of the temperature-time characteristic line for a function given for the whole system comprising a heating element and pressure cooker is used to determine the quantity of liquid cooking material in equivalent water units and from the given function $tv = f(M, M')$ of the system, the time interval is determined by which the preset cooking time for the quantity of liquid cooking material in the pressure cooker is to be shortened; alternatively from the determined length of time using the function $S = f(M')$ for solid cooking material over a small amount of water brought to the steaming point given for the whole system comprising a heating element and pressure cooker, a determination is made in equivalent water units, and from the given function $tv = f(M, M')$ of the system the time interval is determined by which the preset cooking time for the quantity of solid cooking material in the pressure cooker is shortened. For liquid cooking material, the function $\Delta T/t = f(M)$ is constant for a cooking system comprising a pressure cooker and heating element. If, therefore, the slope of the temperature-time characteristic line $T = f(t)$ is determined in the heating phase, the amount $M$ of liquid cooking material contained in the pressure cooker can be derived in equivalent water units WE. To steam solid cooking material over a water bath, the period of time S between reaching the beginning of the vapor phase at Td=90° C. and reaching the evaporation temperature Tv=100° C. is, according to the function S=f(M'), an additional variable that characterizes the cooking system. The period of time S is, of course, dependent on the quantity M' of solid cooking material in equivalent water units WE over the water bath in the pressure cooker. Since it has been found that the cooling phase is dependent on both the amount M of liquid and the amount M' of solid cooking material, in other words, on the total amount Mg=M+M', a function tv=f(M,M') may also be derived for a cooking system; after determination of the quantities M and M' from the functions $\Delta T/t=f(M)$ and S=f(M'), the time interval tv to shorten the preset cooking time tg for the cooking process may be determined so that the cooling phase is automatically taken into consideration and the temperature at the pressure cooker is maintained only during the preset cooking time tg and heating element is shut off at the correct time. This automatic adjustment is achieved by determining from the slope of the temperature-time characteristic line a first quantity of liquid cooking material and from the elapsed period of time a second quantity of solid cooking material in equivalent water units and by deriving the time interval for the total quantity of the cooking material from the sum of the quantities of liquid and solid cooking material from the function tv=f(M,M') for the whole system.

The process according to this invention may be simplified by using the slope of the temperature-time characteristic line to determine the time interval to shorten the preset cooking time only when it falls short of a predetermined value, and also by preventing the measurement of the time interval when the slope of the temperature-time characteristic line falls short of a predetermined value, and by deriving the time interval only from the functions $\Delta T/t=f(M)$ and tv=f(M,M') of the system, as well as by determining the time interval only when the slope falls short of a predetermined value for the slope of the temperature-time charcteristic line and by deriving the time interval from the functions S=f(M') and tv=f(M,M') of the system. The preselected value for $\Delta T/t$ is established from the amount of water for cooking with solid cooking material. Since the cooking process for liquid cooking material generally exceeds the amount of water corresponding to the predetermined value, the preselected value for $\Delta T/t$ of the temperature-time characteristic line T=f(t) may decrease with increasing amounts of liquid cooking material; when the predetermined value $\Delta T/t$ is not reached, a cooking process with liquid cooking material is indicated, and when this predetermined value for $\Delta T/t$ is exceeded, a steaming process for solid cooking material is indicated. In the determination of the liquid cooking material time, it is sufficient to use the detected slope $\Delta T/t$ to derive cooking material quantity M and time interval tvx. Measurement of the period of time S may be omitted. In the derivation of the amount of solid cooking material, the slope $\Delta T/t$ of the temperature-time characteristic line T=f(t) is not considered in determining the time interval tv, and measurement of the period of time sx provides the value from which the quantity M' of solid cooking material and also the time interval tvx may be derived. It has proven to be perfectly satisfactory if the time interval for shortening the preset cooking time tg is chosen to increase proportionally with the total amount Mg of liquid and solid cooking material contained in the pressure cooker in equivalent water units. The function tv=f(M,M') may then be derived and utilized to determine the time interval tv.

To avoid inaccuracies in measuring and determining the cooking time during the heating phase, another embodiment provides for measurement of the preset cooking time to be triggered when a predetermined measurement temperature that lies between the water evaporation temperature and the actual cooking temperature is reached. Measurement of the preset cooking time is then initiated at a predetermined temperature that is close to the adjusted cooking temperature and is, therefore, independent of the shape of the temperature-time characteristic line T=f(t) in the heating phase.

A simple apparatus to execute the process of this invention is provided wherein the temperature in or on the pressure cooker is measured by a temperature sensor that emits a signal proportional to the temperature, a differentiating element derives from the temperature sensor signal an evaluator signal proportional to the slope of the temperature-time characteristic line, when the temperature indicating the beginning of the vapor phase is reached a time measurement device is triggered that measures the time until the water evaporation temperature is reached, the first evaluator signal representing the slope of the temperature-time characteristic line, the measured time interval and the predetermined cooking time are fed to a logic element and that the logic, utilizing the functions $\Delta T/t=f(M)$, S=f(M') and tv=f(M,M'), derives therefrom a shortened cooking time, and after the expiration of this shortened cooking time causes the heating element to shut off. The improvements provided by this process can be realized with this device especially when the logic processes only the first evaluator signal emitted after the corresponding slope of the temperature-time characteristic line falls short of a predetermined value, and prevents the triggering of the time measuring device when the slope of the temperature-time characteristic line exceeds a predetermined value.

BRIEF DESCRIPTION OF THE DRAWINGS

The invention will be explained in greater detail with the help of the drawings in which.

DESCRIPTION OF THE PREFERRED EMBODIMENT

Figure 1:
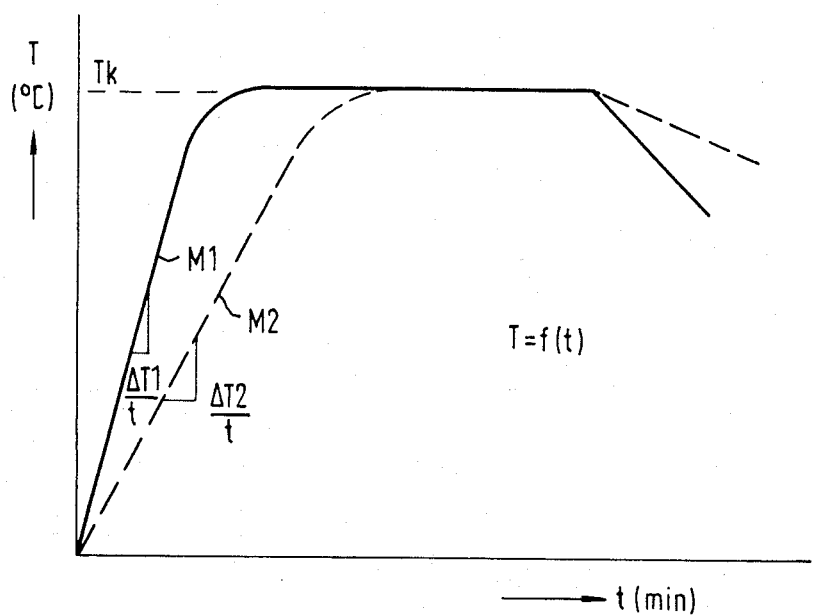
FIG. 1 shows the temperature-time characteristic line for a cooking process with liquid cooking material.

The diagram of FIG. 1 shows the temperature-time characteristic line T=f(t) for a cooking system comprising a heating element and steam pressure cooker, where T represents the temperature in ° C. in or on the pressure cooker, which is used to regulate the heat output. After the heating phase, a constant cooking temperature Tk is set between about 110° and 120° C. In this case, there is a liquid cooking material in the pressure cooker. As the characteristic lines show, the slope $\Delta T1/t$ or $\Delta T2/t$ of the temperature-time characteristic line T=f(t) is dependent on the quantity M1 or M2 of liquid cooking material.

Figure 2:
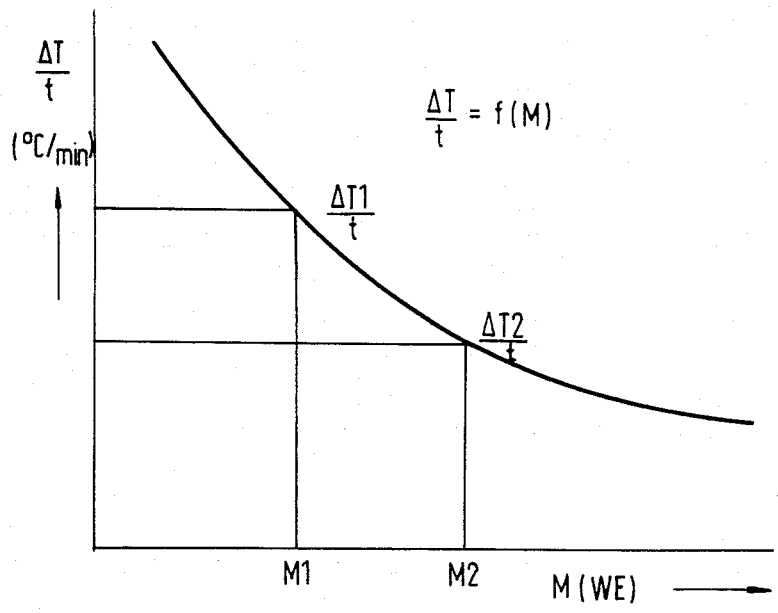
FIG. 2 shows the function $\Delta T/t=f(M)$ of a cooking system which, for a determined slope T/t of the characteristic line according to FIG. 1, allows a direct determination of the quantity M of liquid cooking material in the pressure cooker.

With increasing quantities of liquid cooking material the slope $\Delta T/t$ of the temperature-time characteristic line T=f(t) decreases. This dependency is demonstrated by the function $\Delta T/t=f(M)$ of FIG. 2. This function is constant for a given cooking system and therefore the detected slope $\Delta T/t$ of the temperature-time characteristic line is directly proportional to the amount M of liquid cooking material in the pressure cooker.

Figure 3:
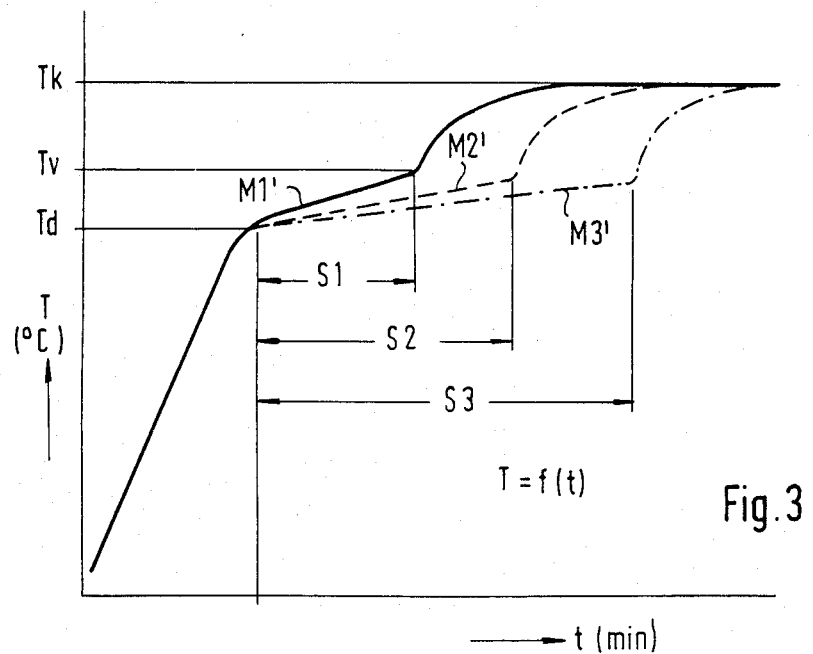
FIG. 3 shows the temperature-time characteristic lines in a steaming process with solid cooking material over a water bath.
Figure 4:
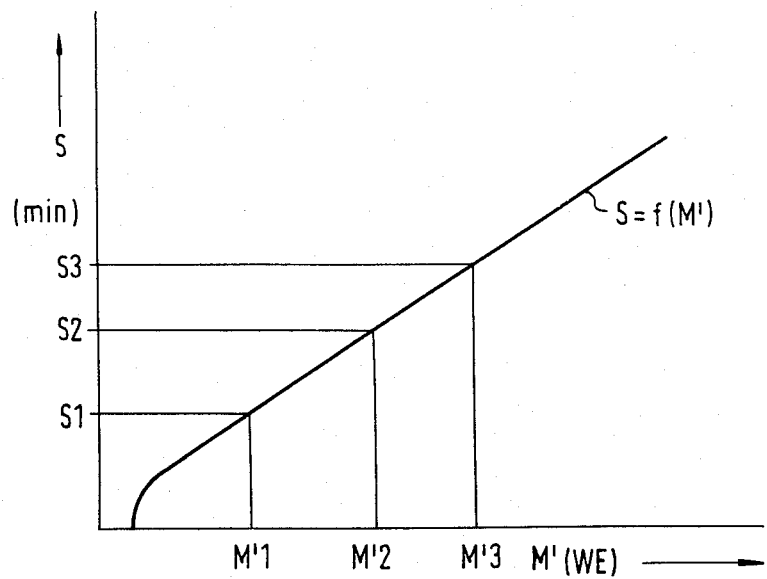
FIG. 4 shows the function S=f(M') of the same cooking system which, for a determined period of time S according to the characteristic lines of FIG. 3, allows a direct determination of the quantity M' of solid cooking material in the pressure cooker.

The diagram of FIG. 3 shows the temperature-time characteristic line T=f(t) for the same cooking system during a steaming process of solid cooking material. The water bath for steam production has a relatively low volume of water, so that the slope of the characteristic line is independent of the quantity M1', M2' or M3' of solid cooking material and is constant up to the temperature Td=90°, at which temperature the vapor phase begins. The temperature at which the vapor phase begins is represented by the declining slopes of the temperature-time characteristic line T=f(t). This decreased slope is due to an increased withdrawal of energy by evaporation. The heating phase up to the evaporation temperature of water Tv=100° C. is, however, dependent on the quantity M' of solid cooking material. It is assumed that during this part of the heating process the valve or auxiliary valve of the pressure cooker is still open. As FIG. 4 shows, the period of time S which elapses between reaching temperature Td and reaching temperature Tv is directly proportional to the quantity M' of solid cooking material within the pressure cooker. Time period S is proportional to the quantity M' of solid cooking material, as the values S1, S2 and S3 for the quantities M1', M2' and M3' demonstrate.

Figure 5:
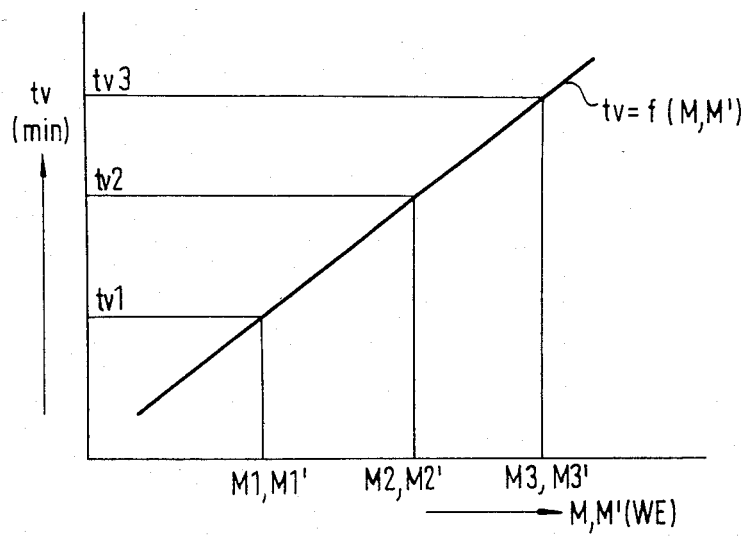
FIG. 5 shows the function tv=f(M,M') of the same cooking system which gives the time interval tv by which the preset cooking time tg for the determined total quantity Mg=M+M' of cooking material can be shortened, in order to shut off the heating element prematurely to maintain the temperature Tm for the preset cooking time tg.

It has been discovered that the total amount Mg of cooking material influences the cooling phase. When the heating element is shut off, the temperature-time characteristic line T=f(t) drops faster or slower depending on the amount of cooking material, as shown in the diagrams in FIGS. 7 and 8. If the cooking process is limited to a predetermined time tg, a measuring temperature Tm is used that is somewhat below cooking temperature Tk. When the measuring temperature Tm is reached during the heating phase, measurement of the preset cooking time begins. This occurs at time point te of the temperature-time characteristic line T=f(t). When the heating element is shut off at the time point ta, the cooling phase begins. There is still the time interval tv until the cooking temperature Tk drops to the measurement temperature Tm. During this time interval tv, therefore, the cooking process continues. If temperature Tm is maintained during cooking time tg, shortened cooking time tg' can be chosen as the difference tg−tv, and the heating element can be shut off at time ta. As FIG. 5 shows, time interval tv depends upon cooking material quantity M or M' or M+M' in the pressure cooker.

For a given cooking system the function tv=f(M,M') is constant. If, therefore, from the slope $\Delta T/t$ of the temperature-time characteristic line T=f(t) and the time period S between reaching temperature Td and temperature Tv of the temperature-time characteristic line T=f(t), the quantities M and M' of liquid and solid cooking material can be determined, the function tv=f(M,M') expresses a relationship between the cooling phase and time interval tv. With the inclusion of slope $\Delta T/t$ and time period S of the temperature-time characteristic line T=f(t), it is therefore possible to determine the nature and the quantity of the cooking material, and to adjust predetermined cooking time tg automatically so that the heating element is prematurely shut off to maintain measurement temperature Tm over a time period that corresponds to the predetermined cooking time tg.

Figure 6:
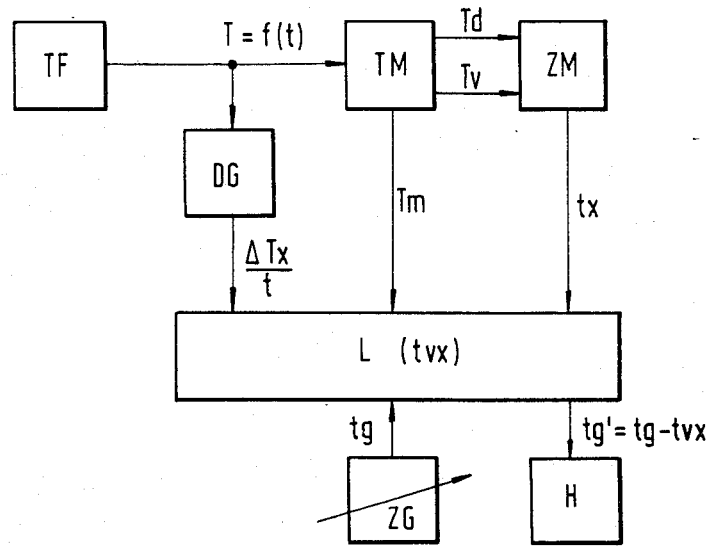
FIG. 6 shows a block diagram of a device according to this invention to automatically adapt a preselected cooking time to various amounts and types of cooking materials.

As shown in FIG. 6, the temperature in or on the pressure cooker is detected by means of a temperature sensor TF. Temperature sensor TF emits an output signal proportional to the temperature in the pressure cooker and corresponding to the shape of temperature-time characteristic line T=f(t). By means of differentiating means DG, a first evaluation signal characterizing slope $\Delta T/t$ is obtained. Also, the output signal of temperature sensor TF controls temperature measuring means TM which triggers time measuring means ZM when temperature Td is reached. Time measurement means ZM determines time period S up to reaching temperature Tv, which is communicated to time measurement means ZM by temperature measurement means TM. Time measuring means ZM feeds a signal characterizing time period S to the logic means L, to which the first evaluating signal characterizing slope $\Delta T/t$ is also fed by differentiating means DG. Logic L derives from these signals, taking into account the constants of the cooking system, including functions $\Delta T/t=f(M)$, S=f(M') and tv=f(M,M'), the time interval tv by which predetermined cooking time tg should be shortened. Heating element H is turned on only during shortened time tg'. Desired cooking time tg is preset by adjustable timing means ZG and fed to logic means L. Since the reaching of measurement temperature Tm is also indicated to the logic means L, it can determine time point te to begin time measurement and, with shortened time tg' correctly set, time point ta to automatically shut off heating element H. Shut off time point ta is automatically adjusted to the kind and quantity of cooking material, and the time constants of the cooking system are automatically taken into account with respect to the cooking time.

Figure 7:
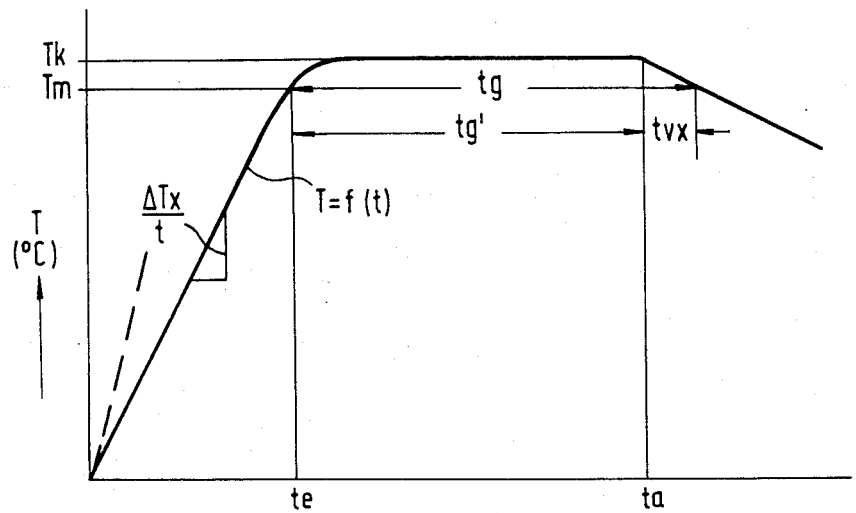
FIG. 7 shows the temperature-time characteristic line T=f(t) for a cooking process with liquid cooking material using the process of the invention.

When the cooking process of FIG. 7 is monitored and controlled with the device of FIG. 6, slope $\Delta Tx/t$ is determined in the heating phase. This slope is smaller than a predetermined slope, as indicated by the broken line in FIG. 7. If temperature Tm is to be maintained from time te for predetermined cooking time tg, then heating element H must be shut off at time point ta, since the cooling phase shows a temperature higher than Tm over time interval tvx. Slope ΔTx/t is fed to logic means L, which recognizes when a cooking process with liquid cooking material is involved. A time measurement is superfluous and logic L can establish from slope ΔTx/t the time interval tvx, and therefrom the shut off time point ta.

Figure 8:
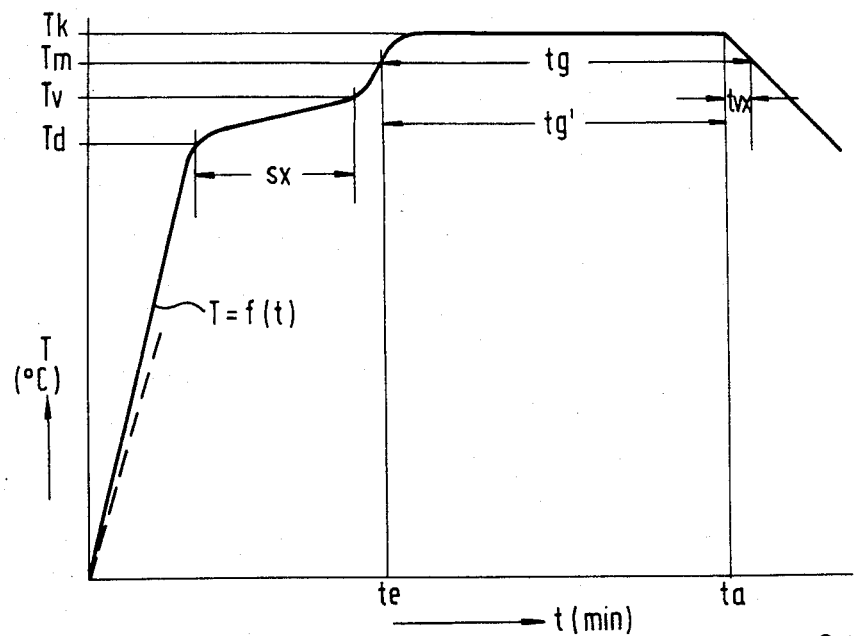
FIG. 8 shows the temperature-time characteristic line T=f(t) for a cooking process to steam solid cooking material using the method of the invention.

The cooking process according to FIG. 8 may be monitored and controlled with the device according to FIG. 6 in a simplified method. In the heating phase slope ΔT/t is determined which is equal to or greater than the predetermined value as represented by the broken line. This value is established on the basis of the amount of water in the cooker to generate steam, so that it is exceeded in the cooking process with solid cooking material. Logic L recognizes that a cooking process with solid cooking material is involved. The slope ΔT/t is omitted and only time period sx is determined and used to derive time interval tvx.

Naturally, logic L can also use both determined values, slope ΔTx/t and time period sx, to derive time interval tvx. The determined quantities M of liquid cooking material and M' of solid cooking material are added together and used to derive time interval tvx from the function tv = f(M,M').

I claim:

1. Process for adjusting a preset cooking time for a cooking process for cooking food materials in a steam pressure cooker heated by a heating means controlled by a control circuit in which the temperature of said steam pressure cooker and its food materials is detected at times during the cooking process and utilized by said control circuit to regulate the heat output of said heating means and in which a cooking time (tg) is preset by an adjustable timing means and adjusted by said control circuit dependent upon said food materials, comprising:
   measuring the temperature of said cooker during a heating phase and determining a slope (ΔTx/t) of a temperature-time curve (T = f(t)) during said heating phase, said slope of said temperature-time curve characteristic of said cooking process and said food materials;
   determining a time interval (tvx) based upon said slope (ΔTx/t), a function (ΔT/t = f(M)) characteristic of a cooking system comprising said heating means, said steam pressure cooker, and a quantity of liquid food material (M) in equivalent water units (WE), and a function tv = f(M) characteristic of said cooking system, said time interval (tvx) increasing as said slope (ΔTx/t) decreases;
   shortening said preset cooking time (tg) by said time interval (tvx) to determine a shortened cooking time (tg'); and
   deactivating said heating means after said shortened cooking time (tg') has elapsed.

2. Process for adjusting a preset cooking time for a cooking process for cooking food materials in a steam pressure cooker heated by a heating means controlled by a control circuit in which the temperature of said steam pressure cooker and its food materials is detected at times during the cooking process and utilized by said control circuit to regulate the heat output of said heating means and in which a cooking time (tg) is preset by and adjustable timing means and adjusted by said control circuit dependent upon said food materials, comprising:
   measuring a time period (sx) elapsing between said cooker reaching a vapor phase temperature (Td = 90° C.) and an evaporation temperature of water (Tv = 100° C.), said time period (sx) characteristic of said cooking process and said food materials;
   determining a time interval (tvx) based upon said time period (sx), a function (S = f(M')) characteristic of a cooking system comprising said heating means, said steam pressure cooker, and a quantity of solid food material (M') in equivalent water units (WE), and a function tv = f(M') characteristic of said cooking system, said time interval (tvx) increasing as said time period (sx) increases;
   shortening said preset cooking time (tg) by said time interval (tvx) to determine a shortened cooking time (tg'); and
   deactivating said heating means after said shortened cooking time (tg') has elapsed.

3. Process for adjusting a preset cooking time for a cooking process for cooking food materials in a steam pressure cooker heated by a heating means controlled by a control circuit in which the temperature of said steam pressure cooker and its food materials is detected at times during the cooking process and utilized by said control circuit to regulate the heat output of said heating means and in which a cooking time (tg) is preset by an adjustable timing means and adjusted by said control circuit dependent upon said food materials, comprising:
   measuring the temperature of said cooker during a heating phase and determining a slope (ΔTx/t) of a temperature-time curve (T = f(t)) during said heating phase, and determining a quantity of liquid food material (M) in equivalent water units (WE) according to a function (ΔT/t = f(M)) characteristic of a first cooking system comprising said heating means, said steam pressure cooker, and said quantity of liquid food material (M);
   measuring a time period (sx) elapsing between said cooker reaching a vapor phase temperature (Td = 90° C.) and an evaporation temperature of water (Tv = 100° C.), and determining a quantity of solid food material (M') in equivalent water units (WE) according to a function S = f(M') characteristic of a second cooking system comprising said heating means, said steam pressure cooker and said quantity of solid food material (M');
   determining a time interval (tvx) for a total amount of said food materials comprising the sum of said quantities of liquid and solid food materials (M + M') from a function tv = f(M, M') characteristic of a total cooking process, said time interval (tvx) increasing as said slope (ΔTx/t) decreases and said time period (sx) increases:
   shortening said preset cooking time (tg) by said time interval (tvx) to determine a shortened cooking time (tg'); and
   deactivating said heating means after said shortened cooking time (tg') has elapsed.

4. The process of claim 3 wherein said slope (ΔTx/t) is used to derive said time interval (tvx) for shortening said preset cooking time (tg) only when said slope is below a predetermined value.

5. The process of claim 3 wherein when said slope (ΔTx/t) is below said predetermined value for said slope, said time interval (tvx) is derived only from functions ΔT/t = f(M) and tv = f(M,M') characteristic of a total cooking process.

6. The process of claim 4 wherein when said slope (ΔTx/t) is below said predetermined value for said slope, said time interval (tvx) is derived only from functions $\Delta T/t = f(M)$ and $tv = f(M,M')$ characteristic of said total cooking process.

7. The process of claim 4 wherein when said slope ($\Delta Tx/t$) is above said predetermined value for said slope, only said time period (sx) is determined and said time interval (tvx) is derived from functions $S = f(M')$ and $tv = f(M,M')$ characteristic of said total cooking process.

8. The process of claim 3 wherein said time interval (tvx) to shorten said preset time (tg) increases proportionately with a total quantity of liquid and solid food material (M+M') in equivalent water units (WE).

9. The process of claim 3 wherein measurement of said preset cooking time (tg) commences upon said cooker reaching a predetermined temperature (Tm) between said evaporation temperature of water (Tv) and a desired cooking temperature (Tk).

* * * * *